United States Patent

Nelson

[11] Patent Number: 4,591,285
[45] Date of Patent: May 27, 1986

[54] ROD RETAINER

[75] Inventor: John F. Nelson, New Lenox, Ill.

[73] Assignee: Illinois Tool Works Inc., Chicago, Ill.

[21] Appl. No.: 787,118

[22] Filed: Oct. 15, 1985

[51] Int. Cl.$^4$ ............................................. F16C 11/00
[52] U.S. Cl. ........................................ 403/11; 403/71
[58] Field of Search ................... 403/69, 70, 71, 13, 403/14, 11; 248/74.2, 74.3

[56] References Cited

U.S. PATENT DOCUMENTS

| | | | |
|---|---|---|---|
| 3,695,652 | 10/1972 | Ratnikas | 403/69 |
| 3,991,960 | 11/1976 | Tanaka | 248/68.1 |
| 3,993,410 | 11/1976 | Lindsay, Jr. | 403/13 |
| 4,306,820 | 12/1981 | Nelson | 403/13 |

FOREIGN PATENT DOCUMENTS 2066887  7/1981  United Kingdom ............... 248/74.3

Primary Examiner—Andrew V. Kundrat
Attorney, Agent, or Firm—A. J. Brunett; T. W. Buckman

[57] ABSTRACT

A novel one piece plastic couple is disclosed. The couple comprises a first member whose inner surface is conformed to the shape of the member to be coupled and has a first latch means on its distal end, a second member hingedly connected to the first member as its distal end and to a base member at its proximal end, a third member affixed to the base member at its proximal end and disposed in the same direction as the first member and spaced a predetermined distance from the first member with a second latch means on its distal end which is designed to properly engage the first latch means when the first member is pivotally moved toward the third member to a final latched position. The couple also has a spring means contained within an inner space defined by the first member, second member and base member which is designed in such a way so as to provide a force against the first member when the first member is pivotally moved toward the direction of extension of the base which is within a range sufficient enough to eject the first member away from the base member when the latches do not properly engage without preventing proper latching when sufficient force is applied to pivotally move said first member into proper latching position.

8 Claims, 7 Drawing Figures ial fitting.

ROD RETAINER

BACKGROUND OF THE INVENTION

The present invention is directed to couples, and more particularly to a couple for a rod retainer for connecting an actuating rod having a right angle end to an apertured lever which automatically insures a proper fitting.

Rod retainers for connecting actuating rods having right angle ends to apertured levers can be used in many different environments, such as the automobile industry. Primary examples in that industry are a door locking actuator or a carburetor linkage.

Such rod retainers are well known and have been secured to an apertured lever by a shouldered extension being inserted into the aperture of the lever which allows the lever to freely rotate with respect to the retainer. The shouldered extension also has a central aperture running throughout its length which receives the right angle end of the rod.

Prior retainers of this type were found to be undesirable since rod removal could occur with removal forces substantially equal to insertion forces. This condition was completely unacceptable since failures were probable and furthermore, since many of the retainers were located in inaccessible places, substantial disassembly was required to correct the problem. Additionally, many of these actuating rods were required to be a blind assembly to the levers on an assembly line and such prior art retainers were difficult to install in such a manner.

The first solution to this problem was disclosed and claimed in Lindsay, Jr. U.S. Pat. No. 3,993,410 which was assigned to the assignee of the present invention. That retainer provided substantially easier blind assembly and improved rod retention.

The second solution to this problem was disclosed and claimed in Nelson U.S. Pat. No. 4,306,820 which was also assigned to the assignee of the present invention. That retainer again provided easier blind assembly combined with an improved retaining means which automatically latched to a rod.

The present invention represents a further improvement over the retainers disclosed in the previous patents by not only providing improved retaining means, but by preventing a false locking situation and by providing a ready visual indication to an operator if the rod is not securely retained and locked within the retainer. It also improves insertion and holding of the right angle end of an actuating rod.

OBJECTS AND SUMMARY OF THE INVENTION

It is therefore a general object of the present invention to provide a new and improved couple for fixing to an elongated member.

It is a further object of the present invention to provide such a couple for capturing and fixing an elongated actuating rod having a right angle end portion to an apertured lever member.

A further object of the present invention is to provide such a couple which is a plastic one-piece construction and can be affixed without any special tools.

It is a still further object of the present invention to provide such a couple which is automaticaly locking when a rod is applied thereto, which prevents over engagement of the locking means which cannot be improperly engaged and which provides a visible indication of improper locking.

Briefly, and in accordance with the foregoing objects, a couple according to the invention comprises a receiving member, a first wall section, a second wall section and a base member.

The receiving member is pivotally connected to the distal end of the first wall section. Both first and second wall sections are affixed to the base at their proximal ends. The distal end of the second wall section has an integral latching means which cooperates with a second latching means on the receiving member.

The receiving member also has a spring arm on its underside which provides an ejection force if improper latching occurs. This force pushes the receiving member away from the second wall section and provides a visual indication of improper latching.

The base member also has a resilient retaining means on its underside to be accepted within an aperture of a work surface or lever. This retaining means has a shoulder which permits rotation between the couple and the work surface.

The couple with the resilient retaining means may also have a socket extending from one of its axial ends which is designed to accommodate a right angle end of an actuating rod.

The socket is beveled for rod easier insertion and terminates with the resilient retaining means. There is also a small arm projection on the inside of the socket. This arm must be overcome with sufficient rod insertion force which is similar to the force needed to engage the latching of the couple. Therefore, unless sufficient insertion force is applied to the rod, the rod is ejected out of the socket and the couple by the arm projection and spring arm respectively and is readily visible as being unlatched.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements and wherein:

DESCRIPTION OF THE PREFERRED EMBODIMENT

Figure 1:
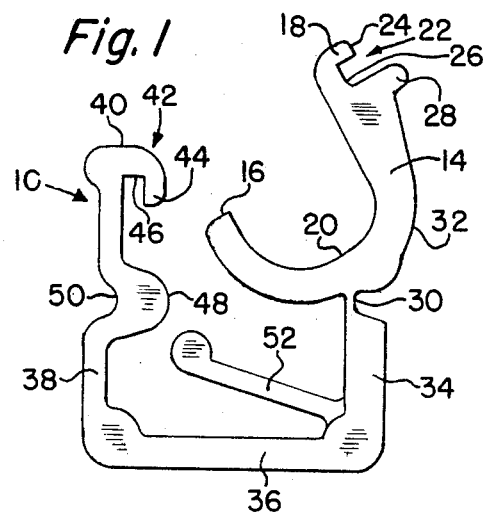
FIG. 1 is a front plan view of the couple of the present invention in its open position.

Referring now to the drawings in greater detail, there is illustrated in FIG. 1 a couple 10 constructed according to the teachings of the present invention.

Figure 4:
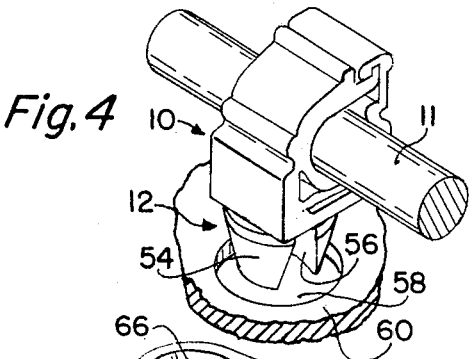
FIG. 4 is a perspective view of the couple of the present invention with a rod retained within it and a resilient retaining means afixed to its bottom side.

The couple 10 is preferably a one-piece molded thermoplastic produce which can be fabricated from nylon or other similar materials which have the capacity of being rigid when formed in heavy sections and resilient when formed in thinner sections. Although the couple 10 can have several different functions it is primarily used in conjunction with a resilient retaining member 12 which is used to anchor the couple 10 to another surface or member as shown in FIG. 4.

As illustrated in FIG. 1, the couple 10 is composed of an arcuate holding member 14 with a proximal end 16 and a distal end 18 whose inner surface 20 generally conforms to the shape of the transverse dimension of an elongated member to be coupled. The distal end 18 includes a latch means 22 which is composed of an outwardly turned hook portion 24, recess 26 and stud 28.

A hinge 30 integral with the outer surface 32 of the holding member 14 is fixed at a point intermediate its proximal end 16 and its distal end 18 and integrally connects the holding member 14 with a first wall section 34. The hinge 30 provides rotation of the holding member 14.

The wall section 34 is in turn integral with a base member 36 at its other end. The base member 36 extends a predetermined distance perpendicular to the wall section 34 and terminates in a second wall section 38 directly opposite the first wall section 34.

This second wall section 38 has a distal end 40 which contains a second latch means 42 which is composed of a hook 44 and recess 46. When the holding member 14 is rotated about the hinge 30 toward the second wall member 38 the second latch means 42 cooperates with the first latch means 22 to close the couple 10.

The second wall section 38 also contains a ridge 48 along its inside length with a corresponding recess 50 on its outside length which permits flexing of the second wall member 38 during latching and prohibits excessive rotation of the holding member 14 by stopping the distal end 18 of the holding member 14.

The couple 10 also contains a spring member 52 which is in the form of a lever which extends from the joint of the first wall member 34 and the base 36.

This spring member 52 projects into the inner space formed between the base 36 and the two wall sections 34 and 38 and provides a force against the holding member 14 when it rotates about its hinge 30. This force prevents a false locking situation by ejecting the holding member 14 outward when the latches 22 and 42 are not completely engage. In this way, a ready visual indication of improper latching is available to the assembler which is necessary in most manufacturing environments which tend to be extremely noisy. Also, hook members 24 and 44 are curved surfaces to prohibit them from improperly locking the couple 10.

Figure 2:
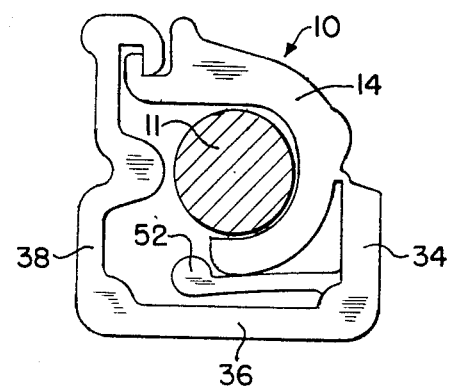
FIG. 2 is a front plan view of the couple of the present invention, similar to FIG. 1, illustrating the rod retainer in its closed position capturing a rod within it.
Figure 3:
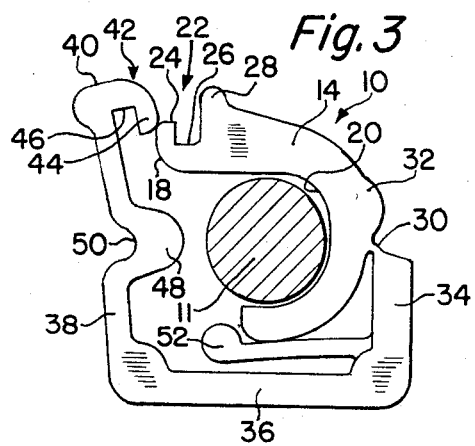
FIG. 3 is a front plan view of the couple of the present invention, similar to FIGS. 1 and 2, illustrating a position between the open and closed position.

To assemble the couple 10 to an elongated rod 11, the couple 10 is first placed in its open position which is illustrated in FIG. 1. Next, the rod 11 is inserted into the inner surface 20 of the holding member 14 of the couple 10. Next, the holding member 14 pivots about its hinge 30 until its distal end 18 contacts the distal end 40 of the second wall section 38 at their respective hooks 24 and 44. Continued rotation of the holding member 14 deflects the second wall 38 which flexes at its recess 50 as well as at the base 36. Before the hooks 24 and 44 engage, the spring member 52 engages the bottom side 32 of the proximal end 16 of the holding member 14 and provides the ejection force described above as shown in FIG. 3. Further rotation of the holding member 14 causes the hooks 24 and 44 to properly engage as shown in FIG. 2. Further rotation is prohibited by both the ridge 48, the latch stud 28 and the spring member 52 which is forced against the base 36.

As noted earlier, the hook members 24 and 44 are curved surfaces. These surfaces, combined with the spring member 52, prevent a false locking situation which was possible with the prior rod retainers and occured when the flat surfaces of the hooks 24 and 44 engaged which closed the the couple 10 without being properly seated in the respective recesses 26 and 46.

As described earlier, the couple 10 is normally used in conjunction with a resilient retaining means 12 integral with the underside of the base 36. It is to be noted, however, that the couple 10 may be used without such a resilient retaining means 12 to serve as a connection between two members, as a means of marking the elongated member or other similar uses.

As illustrated in FIG. 4, the resilient retaining means 12 has a generally cylindrical configuration with a tapered nose portion 54 and one or more axially extending slots 56. This retaining means 12 is generally accepted within an aperture 58 of a work surface or lever 60. The retaining means 12 also contains a shouldered portion 62 which allows the lever 60 to rotate with respect to the couple 10. It can also be seen from the figures that the nose section 54 as well as the axial slots 56 provide for easy insertion of the resilient retaining means 12 into the aperture 58. Many configurations of the resilient retaining means 12 are known by those skilled in the art, but for this embodiment the resilient retaining means 12 is provided with a single axial slot 56 to prevent pulling out from the aperture 58.

Figure 5:
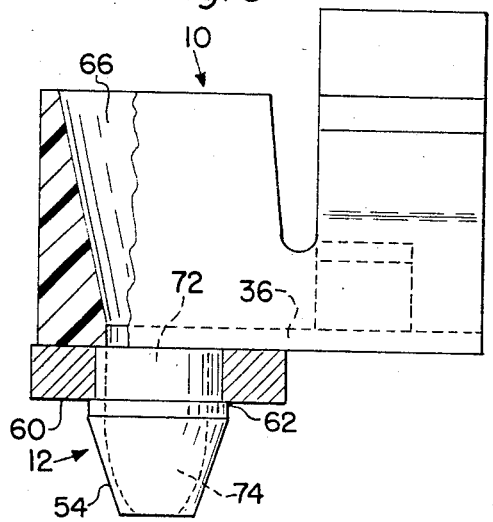
FIG. 5 is a side plan view of the couple of the present invention designed for use with an actuating rod terminating in a right angle end with a cut away of the beveled socket used to retain the right angle end.
Figure 6:
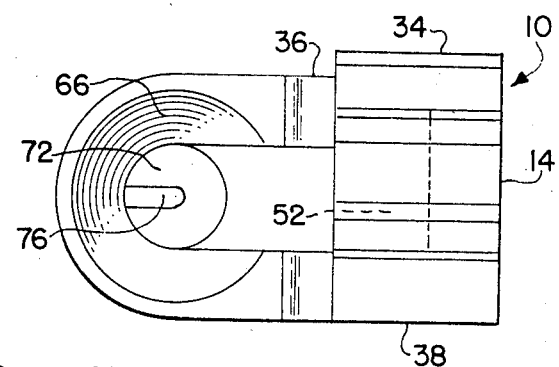
FIG. 6 is a top plan view of the couple of the present invention similar to FIG. 5.
Figure 7:
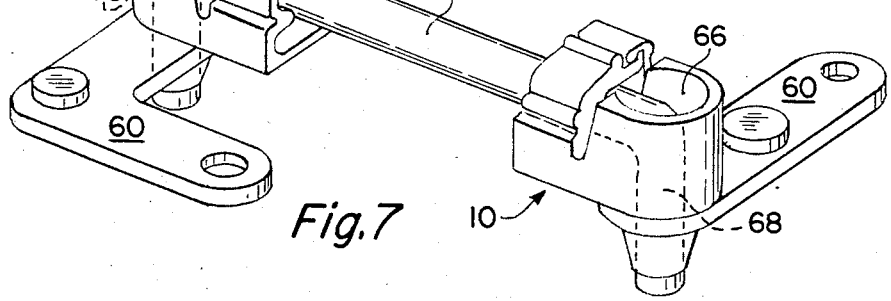
FIG. 7 is a perspective view of two of the couples of the present invention connecting an actuating rod which terminates in a right angle at both ends with two apertured levers.

Another embodiment of the couple 10 of the present invention will now be described in greater detail as illustrated in FIGS. 5-7.

FIG. 7 shows two identical couples 10 which are affixed to opposite ends of an actuating rod 64. In this embodiment, the base 36 extends in a direction perpendicular to the wall sections 34 and 38 and forms a socket 66. This socket 66 accommodates the right angle ends 68 and 70 of an actuating rod 64 and is beveled as shown in FIGS. 5 and 6. The socket 66 terminates in an aperture 72 which extends through the base 36 and is aligned with a bore 74 of a resilient retaining means 12. The aperture 72 also contains an integral spring tab 76 projecting radially inward. This tab 76 provides an additional force against the actuating rod 64 which must be overcome for proper insertion. Failure to overcome this force ejects the rod 64 out of the couple 10 to provide a visual indication of improper coupling as does spring arm 52.

In assembling an actuating rod 64 according to the preferred embodiment, the resilient retaining means 12 of the couple 10 is first inserted through the aperture 58 of the lever 60 and snaps into engagement as described above. Next, one of the right angle ends 68 or 70 is inserted into the beveled section of the socket 66 which guides the rod end 68 or 70 into contact with spring tab 76 and then into the aperture 72. Upon partial insertion of the rod end 68 or 70 into the aperture 72 and then the bore 74 of the resilient retaining means 12, the portion of the rod axially displaced from the right angle end portion 68 or 70 will be received within the inner surface 20 of the holding member 14 of the couple 10. Continued insertion of the rod through aperture 72 and the bore 74 causes the holding member 14 to automatically pivot about the hinge 30 and eventually deflect the second wall section 38 and cause engagement of the two latch means 22 and 42. As described earlier, the spring member 52 by resisting the holding member 14, the spring tab 76 and the hooks 24 and 44 prevent false locking and the ridge 48, stud 28 and spring member 52 prevent over-rotation of the holding member 14.

From the foregoing description it will be appreciated that the present invention provides a new and improved rod retainer for capturing and fixing an elongated member to a work surface. More specifically, the present invention provides a new and improved rod retainer for connecting an elongated actuating rod of a predetermined diameter terminating in a short substantially right angle end portion to an apertured lever. Furthermore, the retainer of the present invention not only automatically locks when an actuating rod is inserted, but engages so that removal is difficult, false engagement is impossible and a visual indication of non-engagement is provided.

While a particular embodiment of the present invention has been shown and described, modifications may be made to the couple without departing from the teachings of the present invention. Accordingly, the scope of the invention is only to be limited as necessitated by the accompanying claims.

I claim:

1. A one piece plastic couple for elongated members comprising:
   a first member having an inner and outer surface and a distal and proximal end and whose inner surface is conformed to the shape of the transverse dimension of an elongated member to be coupled and whose distal end includes a first latch means;
   a second member having a distal and proximal end whose proximal end is affixed to a base member which extends a predetermined distance perpendicular to said second member and whose distal end is hingedly attached to the outer surface of said first member at a point intermediate said distal and proximal ends of said first member so that the inner surface of said first member faces the direction of extension of said base member;
   a third member having a distal and proximal end, whose proximal end is affixed to said base and is disposed in the same direction as said second member and spaced from said second member at a predetermined distance and having a second latch means at its distal end and having a predetermiend length to permit said first and second latch means to properly engage when said said first member is pivotally moved toward said third member to a final latched position;
   a spring means contained within an inner space whose boundaries are defined by the outer surface of the proximal end of said first member said second member and said base member, said spring means being designed in such a way so as to provide a force against said first member when said first member is pivotally moved in the direction of extension of said base, said force exerted by said spring means being within a range sufficient enough to eject said first member away from said base member when said first and second latch means do not properly engage without preventing proper engagement therein when sufficient force is applied to pivotally move said first member into proper latching position.

2. The couple of claim 1, wherein said base is integral with a resilient retaining means on its side opposite said first, second and third members.

3. The couple of claim 2, wherein said resilient retaining means comprises a tapered nose portion with a central aperture and at least one radially extending slot therein.

4. The couple of claim 1, wherein said third member has a slot on its outside surface with a corresponding protuberance on its inside surface to provide flexing at a point midway along its length.

5. The couple of claim 1, wherein said base is integral with a beveled socket member which has a central aperture perpendicular to said base laterally spaced from said first, second and third members for accepting a short substantially right angle end portion of an actuating rod.

6. The couple of claim 5, wherein said beveled socket member is integral with a resilient retaining means on the side opposite said first, second and third members.

7. The couple of claim 6, wherein said resilient retaining means comprises a tapered nose portion with at least one radially extending slot and a central aperture coaxial with and proximate to the diameter of said aperture of said beveled socket member.

8. The couple of claim 5, wherein said socket has a spring arm extending radially inward from said wall of said socket to a predetermined point within said aperture.

* * * * *